UNITED STATES PATENT OFFICE.

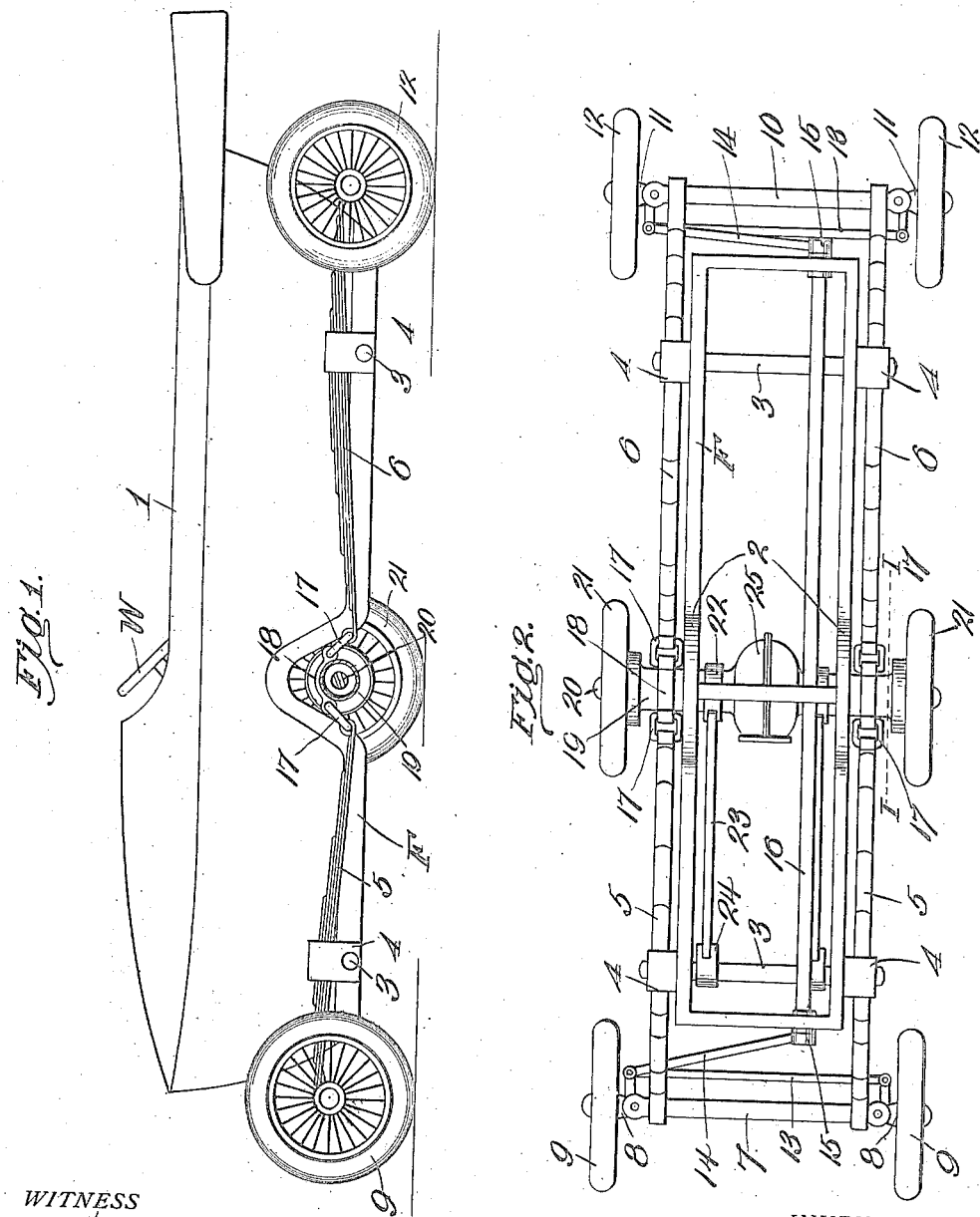

LOUIS P. SMELTZER, OF KANSAS CITY, MISSOURI.

MOTOR-CAR.

1,248,027. Specification of Letters Patent. Patented Nov. 27, 1917.

Application filed December 16, 1916. Serial No. 137,460.

*To all whom it may concern:*

Be it known that I, LOUIS P. SMELTZER, a citizen of the United States, residing at Kansas City, in the county of Jackson and State of Missouri, have invented certain new and useful Improvements in Motor-Cars, of which the following is a specification.

This invention relates to motor cars, and my object is to produce a car in which jolting and pitching motions are reduced to the minimum, which has maximum traction for the drive wheels, and which transmits a minimum of road shocks to the steering wheel and has little tendency to skid in making turns.

More specifically, my object is to provide a car in which the body is fulcrumed on four cantaliver springs extending longitudinally of and outward from the sides of the body-supporting frame, and arranged to impose the load on six wheels, the intermediate pair of wheels constituting the drive wheels.

Another object is to provide a four-spring six-wheel car having connections whereby the rear pair of wheels shall turn reversely to the front pair whenever the latter are turned, so that the wheels shall follow the same general course and thereby facilitate sharp turning and diminish chance of skidding.

A car of the character outlined, possesses not only the features of advantage set forth as desirable, but is more adaptable to low suspension, and also permits of the use of small wheels and tires, thereby reducing the unsprung load and providing greater strength and durability in proportion to its weight than can be provided for in any four wheel car.

With the objects named in view, the invention consists in certain novel and useful features of construction and combinations of parts as hereinafter described and claimed; and in order that it may be fully understood, reference is to be had to the accompanying drawings, in which:—

Figure 1, is a view partly in side elevation and partly in section on the line I—I of Fig. 2.

Fig. 2, is a plan view of the car, with the body omitted.

In the said drawing, the body A of a motor car is shown as provided with a transverse channel 1, at its underside, for the accommodation of parts hereinafter described. F is a frame upon which the body is adapted to be secured in any suitable or preferred manner, and the sides of the frame are bowed upward at 2 to conform to the channel of the body.

3 are cross bars secured in the frame in any suitable manner and forming supports for clips 4, the front pair of clips overhanging and being secured to a pair of front springs 5 and the rear pair of clips overhanging and being secured in any suitable manner to a pair of rear springs 6, the springs 5 and 6 at corresponding sides of the frame being disposed in longitudinal alinement.

The springs 5 are secured at their front ends to the front axle 7 and the latter is equipped at its ends as usual with steering knuckles 8 and upon the outwardly projecting arms of said knuckles are journaled the front wheels 9.

The rear ends of the springs 6 are suitably secured to the rear axle 10 and said axle is equipped with steering knuckles 11 reversely faced with respect to steering knuckles 8 and upon the outwardly projecting arms of the steering knuckles 11 are journaled the rear wheels.

13 are transverse steering rods, respectively connecting the longitudinally projecting arms of steering knuckles 8 and 11. 14 are steering rods pivotally connecting the arms of knuckles 8 and 11 with crank arms 15 on the opposite ends of the longitudinal rock shaft 16 which shaft is adapted to be turned through any suitable gearing, not shown, through the operation of the steering wheel W, it being noted that the rock shaft 16 will effect reverse turning movements of the front and rear wheels so that the rear wheels shall approximately follow the track of the front wheels in making a turn and thus permit the car to be faced about in a narrower space than would be otherwise possible.

A pair of upwardly-converging links 17, are pivoted at their lower ends to the adjacent ends of springs 5 and 6, and at their upper ends to straps or lugs 18, cast with or rigidly secured to a transverse housing 19, inclosing the drive shaft 20, of the usual or any preferred type, and secured upon opposite ends of said shaft, are the drive wheels 21, the same being located in line with the wheels 9 and 12.

A collar 22, is secured rigidly to the housing 19, and connected by a torque rod 23, to a collar 24, secured upon the front cross bar 3. The said housing is provided with the customary enlargement 25, for the accommodation of the usual or any suitable differential gearing, not shown, as the same forms no part of this invention.

A car of the type described, being supported on six wheels, imposes about one-sixth of its weight on each wheel, under normal conditions, and thereby permits of the use of smaller wheels and tires than would be required with a car of substantially the same weight on four wheels, the small wheels and tires reducing the unsprung load and having greater strength per pound.

The use of six wheels with the foremost and rearmost pairs serving as steering and the intermediate pair as drive wheels, permits the car to be turned on a short radius and reduces the chances for skidding in turning corners, and furthermore facilitates low suspension, as the front and rear wheels are disposed beyond the corresponding ends of the frame and the latter is arched over the intermediate or drive axle to permit of wheel play.

The use of six wheels and a pair of springs between each pair of wheels at the same side of the frame and each fulcrumed intermediate its length on said frame, improves the riding qualities of the car as the spring support is much more sensitive than the support afforded by springs arranged in the conventional manner, and reduces the road shocks transmitted to the body, that is, the jolts and slow pitching motion to which a car is subjected on the very best of roads. The jolting is minimized as the springs are so disposed as to make one complete spring length available for the absorption of shocks for each wheel, and in addition thereto the cushioning action of two tires.

The pitching motion in a car is due to the constant raising and lowering of the wheels, as in the best of highways "rolls" or "waves" are always present, and affect the spring support of a car sufficiently to be appreciable to the occupants thereof even though imperceptible to the eye. In fact the pitching motion is invariably sufficient to disturb the sense of balance and on long rides causes a feeling of nausea. With a car of this type the pitching motion is minimized, as each of the springs at one end acts to counteract excessive up and down movement of its other end,—in other words, the load on one end of each spring acts as a damper against excessive movement of the opposite end of the spring, this being more particularly true where the frame is secured on the springs at points unequal distances from the ends thereof, as shown.

As showing that a car of the type forming the subject of this application has more constant road traction than a four wheel car, consider the passage of the two types of cars over a small hole or depression in the roadway. The front wheels of both cars drop and rise without material effect on the rear wheels and then the latter follow the same course as they pass over the hole and diminish the traction in proportion to the drop, the body dropping slightly in each instance. As the wheels rise quickly the supporting springs are compressed and impart quick upward movement to the body to a position above its normal plane, and consequently diminish the normal pressure or load on the wheels and the traction or road grip of the wheels on the ground, it being obvious that if the body rises above the spring limit, the traction is zero. The body usually passes through its normal plane several times before it assumes that position where it imposes a substantially constant pressure on the driving wheels.

With a six wheel car one road hole affects the springs or body support three times, the first and third of these actions increasing the pressure on the drive wheels through the leverage of the springs, and the second action acts on the long and sensitive springs supporting the middle third of the body. It will thus be seen that in the passage of the car over an ordinary hole or depression of the roadway, the body, while having a slight up and down movement as each pair of wheels drop and rise, retains a substantially horizontal position as it is supported by one pair of springs and at the point adjacent the hole, is upheld through the leverage applied through the other pair of springs. In other words, both sets of springs always coöperate in maintaining the body in a horizontal position and thereby largely prevent the objectionable pitching motion mentioned.

It will also be noted that the springs, while affording proper resilient support for the body, act as shock absorbers for each other to prevent excessive freedom of movement of the body, in that the tendency of one set of springs to move upward at the ends where they are pivotally linked to the housing, when their opposite ends drop, is yieldingly resisted by the adjacent ends of the other set of springs, as well as through the fact that the first set of springs, to act as levers, must overcome their inherent resistance to bowing upward between their linked ends and the points where said springs are connected to the frame, this upward bowing being necessary as the distance between the said point of connection with the frame and the housing, through the up and down movement of the frame, probably will never vary enough to permit either set of springs to assume a position in direct alinement with the attached links. The dampening or shock absorbing action can be emphasized by making the springs of unequal length and the points of attachment of the frame with the springs at different distances from the linked ends thereof. It will be apparent that a car of the construction described, maintains the drive wheels in almost constant tractive relation with the road and thus utilizes nearly the full power developed by the motor, which is of course, not possible in any four wheel car.

It will also be apparent that the car has the advantage incident to a long wheel base and the efficiency of the short drive shaft and as both front and rear wheels are steerable and connected through the same shaft to the steering wheel, road shocks on the latter are reduced to the minimum, it being noted that the said wheels are affected at different times by the same object and hence tend to neutralize the shocks transmitted by each set to the steering wheel.

From the above description and drawing, it will be apparent that I have produced a motor car embodying the features of construction enumerated as desirable and while I have illustrated and described the preferred embodiment of the invention, it is to be understood that I reserve the right to make all changes falling within the spirit and scope of the appended claims.

I claim:

1. In a motor car, a series of three parallel shafts, a housing for the intermediate shaft, wheels upon said shafts, a pair of springs connecting the front shaft with the housing of the intermediate shaft, a pair of springs connecting the rear shaft with the housing of the intermediate shaft, and a frame attached at a single point to each spring between the ends thereof.

2. In a motor car, a series of three parallel shafts, the intermediate one being a driven shaft, a housing for said intermediate shaft, wheels upon the said shafts, a pair of springs connecting the front shaft with the housing of the intermediate shaft, a pair of springs connecting the rear shaft with the said housing, a frame attached at a single point to each spring between the ends thereof, and connections for reversely turning the front and rear wheels simultaneously to effect turning movement of the car.

3. In a motor car, a series of three parallel shafts, a housing for the intermediate shaft, wheels upon said shafts, springs bridging the space between and connecting the front shaft with the housing of the intermediate shaft, springs bridging the space between and connecting the rear shaft with said housing, and a rectangular frame between said springs and the front and rear shafts; said frame overlying the housing of the intermediate shaft, and mounted on said springs.

4. In a motor car, a series of three parallel shafts, a housing for the intermediate shaft, wheels upon said shafts, springs bridging the space between and connecting the front shaft with the said housing, springs bridging the space between and connecting the rear shaft with said housing, a rectangular frame between said springs and the front and rear shafts and arched over said housing, and mounted on said springs intermediate the ends thereof, and a body on said frame and provided with a bottom transverse channel receiving said arched portion of the said frame.

In testimony whereof, I affix my signature, in the presence of a witness.

LOUIS P. SMELTZER.

Witness:
G. Y. THORPE.